July 8, 1924.                                                1,500,834
C. MACMILLAN
METHOD OF AND APPARATUS FOR MODIFYING THE CHARACTERISTICS OF
ASYNCHRONOUS DYNAMO ELECTRIC MACHINES
Filed June 7, 1922

Inventor:
Campbell Macmillan,
by Albert G. Davis
His Attorney

Patented July 8, 1924.

1,500,834

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

METHOD OF AND APPARATUS FOR MODIFYING THE CHARACTERISTICS OF ASYNCHRONOUS DYNAMO-ELECTRIC MACHINES.

Application filed June 7, 1922. Serial No. 566,553.

*To all whom it may concern:*

Be it known that I, CAMPBELL MACMILLAN, a citizen of the United States, residing at Schenectady, in the county of Schenectady, State of New York, have invented certain new and useful Improvements in Methods of and Apparatus for Modifying the Characteristics of Asynchronous Dynamo-Electric Machines, of which the following is a specification.

My invention relates to alternating current dynamo electric machines and particularly to the induced members of such machines which are provided with one or more permanently short circuited windings. The principal object of my invention is to provide a novel method of modifying the characteristics of such motors and particularly the starting characteristics.

The two principal methods heretofore used for securing modified characteristics during the starting operation of induction motors are, first, in phase wound rotors, an alternation of the current connection such as by opening or closing the slip rings or other connection points; second, in squirrel cage rotors, using the variation of selective reactance with frequency such as in double squirrel cage and deep bar rotors. The principal aspect of my invention consists in modifying the characteristics of such motors by obtaining selective action in a secondary of the squirrel cage type by magnetically saturating (to a greater or less extent) certain portions of the magnetic structure by artificial means such as by an auxiliary direct current field. By artificial saturation, I mean saturation produced by magnetizing forces other than those of the motor itself.

Figure 1:
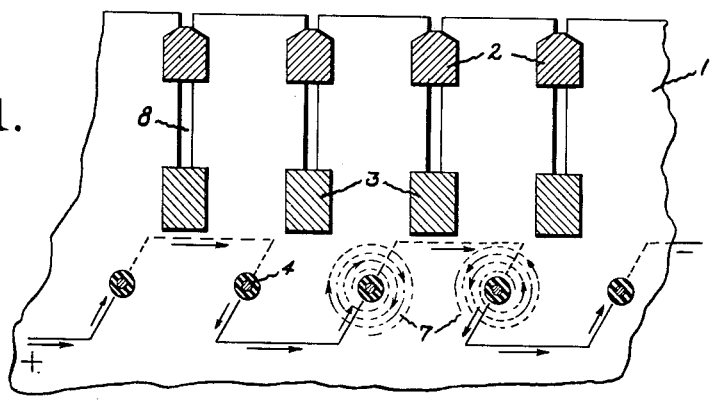
Figure 2:
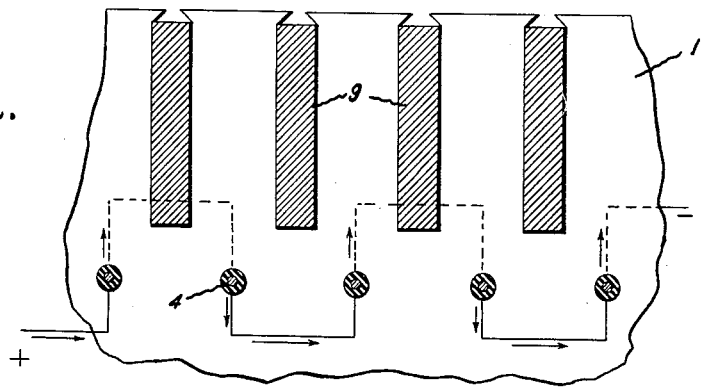
Figure 3:
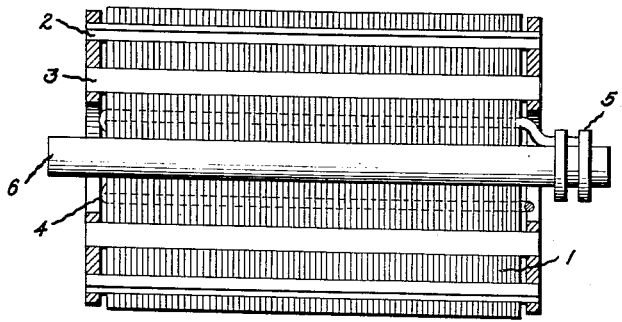

The features of my invention which I believe to be novel and patentable will be pointed out in the claims appended hereto. The method of and apparatus for carrying my invention into effect will now be explained in connection with the accompanying drawings in which Fig. 1 illustrates a section through the secondary member of a double squirrel cage induction motor to which my invention is applied; Fig. 2 illustrates the application of my invention to an induction motor having a deep bar secondary and Fig. 3 illustrates a longitudinal cross section of an induction motor rotor of the double squirrel cage type to which my invention is applied.

Referring to Fig. 1, 1 indicates the laminated structure of the secondary member of a double squirrel cage induction motor provided with high resistance squirrel cage bars 2 in peripheral slots and low resistance squirrel cage bars 3 in slots situated beneath the high resistance squirrel cage. Situated in holes drilled axially through the secondary core between and beneath the low resistance bars 3 is placed a continuous wave winding comprising one or more turns per slot of an insulated conductor 4 threaded back and forth through the holes of the rotor. The winding is suitably connected so as to be excited from a source of direct current as indicated in the illustrations. Where the secondary member constitutes the rotor of the machine, the direct current winding may be connected to slip rings 5 mounted on the rotor shaft 6 as illustrated in Fig. 3.

A relatively small direct current flowing in conductor 4 will completely saturate the iron about the roots of the teeth is indicated by the dotted flux lines at 7, Fig. 1. In this condition, the rotor iron will not permit the passage of the alternating motor flux which would otherwise thread this portion of the core and the alternating flux will thus be forced to thread only the upper squirrel cage bars 2. The action of the direct current field may be varied by adjusting the strength of the current in conductor 4 in any suitable manner and the effect of such variation is made more pronounced by providing an air gap 8 in the magnetic bridge between the two squirrel cage windings. Thus, all of the normal flux of the motor may be made to pass above the lower squirrel cage bars 3 by a small direct current in conductor 4 or all of said flux may be permitted to pass beneath bars 3 when no current flows in the winding 4.

As is well known, it is desirable to have a high resistance squirrel cage for starting purposes and a low resistance squirrel cage for running purposes. This desirable effect is easily obtained to a very high degree by causing a small direct current to flow in the circuit 4 during the starting period and suitably reducing this current and opening its circuit as the motor speed is increased.

This may be done either manually or automatically such as by a centrifugal device operated by the motor itself. Likewise, the slip and thus the speed of the motor during normal operation may be adjusted by varying the current flowing in the direct current winding.

In Fig. 2 the invention is illustrated as applied to a squirrel cage secondary of the deep bar type, the bars of the squirrel cage being indicated at 9. A small direct current in the winding formed by conductor 4 will cause the motor flux to be forced toward the top of bar 9, thereby reducing the active portion of the squirrel cage and increasing the effective resistance proportionally.

The invention may also be used to alter the flux path through an induction motor secondary in a manner to change its asynchronous characteristics to those approaching the characteristics of a synchronous motor. Thus, if an ordinary 2-pole induction motor secondary were provided with a direct current field, positioned to saturate diametrically opposed portions of the secondary magnetic circuit, the motor flux would tend to thread the secondary on a diameter at right angles thereto causing the rotor to become more or less strongly polar depending upon the extent of direct current saturation. The saturation method may also be used for providing the necessary variation of effective impedance in different axes of an induction motor secondary, such, for example, as a motor having different groups of slots containing conductors arranged to obtain cascade effects. The arrangement required would differ from Fig. 1 in that the saturating winding would only be placed under alternate groups of slots.

In accordance with the provisions of the patent statutes, I have described the principle of operation of my invention, together with the apparatus which I now consider to represent the best embodiment thereof; but I desire to have it understood that the apparatus shown is only illustrative and that the invention may be carried out by other arrangements.

What I claim as new and desire to secure by Letters Patent of the United States, is:

1. In a alternating current motor of the induction type, the method of modifying the characteristics thereof which consists in artificially and uniformly saturating the normal flux path beneath the secondary winding.

2. The method of modifying the starting characteristics of an induction motor which consists in artificially saturating the normal flux path beneath the secondary winding during the starting period.

3. In an induction motor of the double squirrel cage type, the method of preventing the normal starting flux of the motor from threading the lower squirrel cage winding which consists in artificially saturating the flux path beneath said winding during the starting period.

4. The method of modifying the starting characteristics of an induction motor which consists in artificially magnetizing the normal flux path beneath the secondary winding during the starting period and varying the extent of such magnetization.

5. A secondary member for an alternating current dynamoelectric machine of the induction type comprising a laminated magnetic structure, a normally active secondary winding situated in slots therein and a normally inactive distributed winding situated beneath said secondary winding and means for energizing said distributed winding with direct current independently of said secondary winding.

6. A double squirrel cage secondary member for an induction motor having a distributed direct current winding beneath said squirrel cage windings and means whereby said direct current winding may be connected to an external direct current source.

7. An induction motor secondary member comprising a laminated magnetic structure, a high resistance squirrel cage winding situated in outer slots, a low resistance squirrel cage situated beneath said first mentioned slots, said two squirrel cage windings being separated by a flux path of higher reluctance than the flux path beneath both of said windings and independent means on said secondary for varying the distribution of the secondary flux between said flux paths.

8. An induction motor rotor comprising a laminated magnetic structure, a high resistance squirrel cage winding situated in peripheral slots and a low resistance squirrel cage winding situated in slots beneath said first mentioned slots, a narrow air gap connecting said two sets of slots and artificial means for saturating the rotor laminations beneath said low resistance squirrel cage.

In witness whereof, I have hereunto set my hand this 6th day of June 1922.

CAMPBELL MACMILLAN.